(12) United States Patent
Hammer

(10) Patent No.: US 9,778,038 B2
(45) Date of Patent: Oct. 3, 2017

(54) MICROMECHANICAL SENSOR

(71) Applicant: Hanking Electronics, Ltd., Canton, OH (US)

(72) Inventor: Hanno Hammer, Graz-Lebring (AT)

(73) Assignee: Hanking Electronics, Ltd., Solon, OH (US)

( * ) Notice: Subject to any disclaimer, the term of this patent is extended or adjusted under 35 U.S.C. 154(b) by 452 days.

(21) Appl. No.: 14/464,307

(22) Filed: Aug. 20, 2014

(65) Prior Publication Data

US 2014/0352433 A1    Dec. 4, 2014

Related U.S. Application Data

(63) Continuation of application No. 13/318,002, filed as application No. PCT/EP2010/055634 on Apr. 27, 2010, now Pat. No. 8,826,736.

(30) Foreign Application Priority Data

Apr. 28, 2009   (DE) .................. 10 2009 002 702

(51) Int. Cl.
*G01C 19/56*     (2012.01)
*G01C 19/5712*   (2012.01)
*G01P 15/08*     (2006.01)

(52) U.S. Cl.
CPC .......... *G01C 19/5712* (2013.01); *G01P 15/08* (2013.01); *G01P 15/0888* (2013.01)

(58) Field of Classification Search
CPC ................................................ G01C 19/5712
See application file for complete search history.

(56) References Cited

U.S. PATENT DOCUMENTS 5,487,305 A    1/1996   Ristic et al.
6,089,088 A    7/2000   Charvet
(Continued)

FOREIGN PATENT DOCUMENTS

CN    1407574 A    4/2003
CN    1559882 A    1/2005
(Continued)

OTHER PUBLICATIONS

Office Action dated Jul. 14, 2014, in related Chinese Patent Application No. 201080018949.4.
(Continued)

*Primary Examiner* — John Chapman, Jr.
(74) *Attorney, Agent, or Firm* — Hartman Global IP Law; Gary M. Hartman; Domenica N.S. Hartman

(57) ABSTRACT

A micromechanical sensor comprising a substrate (5) and at least one mass (6) which is situated on the substrate (5) and which moves relative to the substrate (5) is used to detect motions of the sensor due to an acceleration force and/or Coriolis force which occur(s). The mass (6) and the substrate (5) and/or two masses (5, 7) which move toward one another are connected by at least one bending spring device (6). The bending spring device (6) has a spring bar (9) and a meander (10), provided thereon, having a circle of curvature (K1; K6; K8; K9; K11) whose midpoint (MP1; MP6; MP8; MP9; MP11) and radius of curvature (r1; r6; r8; r9; r11) are inside the meander (10). For reducing stresses that occur, in addition to the radius of curvature (r1; r6; r8; r9; r11) having the inner midpoint (MP1; MP6; MP8; MP9; MP11), the meander (10) has at least one further radius of curvature (r2; r3; r4; r5; r7; r10) having a midpoint (MP2; MP3; MP4; MP5; MP7; MP10) outside the meander (10). The at least one further radius of curvature (r2; r3; r4; r5; r7; r10) is situated between the meander (10) and the spring bar (9).

16 Claims, 6 Drawing Sheets

(56) References Cited

U.S. PATENT DOCUMENTS

| | | |
|---|---|---|
| 6,401,536 B1 | 6/2002 | O'Brien |
| 6,536,282 B1 | 3/2003 | Kipp et al. |
| 8,353,212 B2 | 1/2013 | Hammer |

FOREIGN PATENT DOCUMENTS

| | | |
|---|---|---|
| DE | 4229507 A1 | 9/1992 |
| DE | 19823690 C1 | 5/1998 |
| DE | 19920066 A1 | 5/1999 |
| DE | 10249979 A1 | 2/2004 |
| DE | 69822756 T2 | 4/2005 |
| DE | 102006052522 A1 | 5/2008 |
| DE | 102007035806 A1 | 12/2009 |
| DE | 102007057044 A1 | 12/2009 |
| EP | 1288986 A1 | 8/2002 |
| WO | 2006070059 A1 | 7/2006 |
| WO | 2008052306 A1 | 5/2008 |
| WO | 2009016240 A1 | 2/2009 |

OTHER PUBLICATIONS

Certificate of Invention Patent dated Jan. 7, 2015, in Chinese Patent No. CN102428348B, dated Jan. 7, 2015 (1pg).
Search Report dated Oct. 7, 2009, in German Patent Application No. 1020090027025, filed Aug. 28, 2009 (4pgs).
Office Action dated Nov. 19, 2013, in corresponding Chinese Patent Application No. 201080018949.4.
International Search Report for co-pending PCT Application No. PCT/EP2010/055634, dated Jul. 23, 2010.

MICROMECHANICAL SENSOR

CROSS REFERENCE TO RELATED PATENT APPLICATIONS

This application is a continuation of previously filed and copending application Ser. No. 13/318,002, filed Oct. 28, 2011, which is the National Phase Application Under 35 U.S.C. §371 of International Application No. PCT/EP2010/055634, filed Apr. 27, 2010, which claims priority to German Patent Application No. 10 2009 0002 702.5, filed Apr. 28, 2009, which applications and patents are hereby incorporated herein by reference in their entireties, and from which applications and patents priority is hereby claimed.

BACKGROUND

A. Technical Field

The present invention relates to a micromechanical sensor comprising a substrate and at least one mass which is situated on the substrate and which moves relative to the substrate for detecting motions of the sensor due to an acceleration force and/or Coriolis force which occur(s), the mass and the substrate and/or two masses which move toward one another being connected by at least one bending spring device, and the bending spring device having a spring bar and a meander, provided thereon, having a circle of curvature whose midpoint is inside the meander.

B. Background of the Invention

Micromechanical sensors are used for detecting accelerations and/or yaw rates along a spatial axis or at least one of three mutually orthogonal spatial axes. The operating principle is basically that a sensor mass is moved relative to a substrate as a response to the corresponding acceleration or yaw rate of the sensor. For this purpose, the sensor mass is movably mounted on the substrate by means of a bending spring device, which is generally composed of one or more bending springs. The design of these bending springs primarily determines the particular directions in which the sensor mass is movable. The spring stiffnesses of the bending springs are different in the individual spatial directions in order to more or less permit different bending directions. This difference in movability may be influenced by varying the cross-sectional surface area of the bending spring, and also by virtue of the spatial course of the bending spring. In particular for a meandering design of the bending spring, relatively high elasticity may be achieved in the plane of the meander. However, shock effects due to impacts to the sensor may cause extreme bending stresses which may result in damage to the bending spring device.

An acceleration sensor is known from U.S. Pat. No. 6,401,536 B1, in which a sensor mass is attached to an anchoring of a substrate by means of a bending spring device. The bending spring device is composed of multiple individual bending springs, which in each case are attached at one end to the anchoring. In addition, at its end facing the sensor mass the bending spring is divided into two branches, each of which is situated on the sensor mass. Each of the branches of the bending spring is curved in a meandering shape, the individual sections extending in parallel to one another. Each turn of the meander is inflected by 180° in a semicircular manner. Depending on the design described, one or more meanders per branch is/are provided. Each of the turns of the meander is such that the midpoint of the particular circle of curvature to which the bending spring conforms is inside the particular meander.

A micromechanical gyroscope is known from DE 698 22 756 T2, in which a sensor mass is likewise attached to an anchoring of a substrate by means of a bending spring device. The bending spring device, the same as in the previously cited document, permits elastic movability of the sensor mass about the anchoring. The bending spring device is composed of three individual bending springs, each of which is curved in a meandering shape. The individual sections of the meander are not oriented parallel to one another. The bending radius of the particular bending spring extends over less than 180° in the corresponding section, so that the arms are spread apart. Once again, the midpoint of the particular bending radius is inside the meander.

One disadvantage of the prior art is that relatively high peak stresses occur in the bending spring devices during extreme deflections of the sensor mass. This may result in damage to the springs, and thus, to the entire sensor. In particular, the springs may break or become torn, thus hindering or completely preventing the movability of the sensor mass.

The object of the present invention, therefore, is to provide a micromechanical sensor which has a movable sensor mass for which on the one hand its movability is controllable, and for which on the other hand even high bending loads may be absorbed at its springs without the expectation of damage.

The object is achieved by a micromechanical sensor having the features of Claim 1.

A micromechanical sensor according to the invention has a substrate and at least one mass which is situated on the substrate and which moves relative to the substrate for detecting linear and/or angular accelerations of the sensor. On the one hand, the mass moves in the sense of a drive motion form, which in the absence of external accelerations is stationary, and on the other hand responds with detection motions when acceleration forces and/or Coriolis forces act on the sensor. The moving sensor mass is attached to the substrate by means of at least one bending spring device. Alternatively, multiple masses which move toward one another may be connected by at least one bending spring and moved relative to one another. Consequently, it is not necessary in each case for the sensor mass to be situated directly on the substrate. In some embodiments of micromechanical sensors according to the invention, the sensor mass may also be attached to a drive mass, for example, and together with the drive mass moved as a primary motion, and moved relative to the drive mass only for indicating an acceleration force and/or Coriolis force. The sensor mass and the drive mass are then connected to one another via the corresponding bending spring device. The bending spring device has a spring bar and a meander provided thereon.

The meander has a radius of curvature having a midpoint inside the meander. A particular elasticity of the bending spring device is achieved as a result of the meandering design of the bending spring device. According to the invention, the bending spring device is designed in such a way that, in addition to the radius of curvature having the inner midpoint, the meander has at least one further radius of curvature having a midpoint outside the meander. The at least one further radius of curvature is situated between the meander and the spring bar. Stresses which occur on the bending spring device are thus reduced. Damage or even breakage of the bending spring device during extreme deflections of the sensor mass are thus avoided. In addition, uniform deflection of the sensor mass is assisted, so that besides the reduction in the risk of damage, the accuracy of the micromechanical sensor in detecting accelerations or rotational motions of the sensor is improved.

In one advantageous embodiment of the invention, the bending spring device has multiple spring bars. When the meander is situated on the spring bar, stresses which occur on the bending spring device may be greatly reduced due to bending which is present. The risk of breakage of or damage to the spring bar is thus reduced.

If the meander is designed in such a way that it merges into the spring bar in a rounded manner, stresses which are caused by bending may be achieved which are more uniform and which do not have unacceptable peaks, even in extreme bending situations. Adjacent components of the meander may in particular be a first and a second spring bar, the sensor mass, the substrate itself, or an anchoring for attachment to the substrate.

Similarly as for the meander merging into the adjacent component in a rounded manner in order to avoid stress peaks, it is advantageous when the spring bar(s) likewise merge(s) in a rounded manner into the adjacent component, in particular the sensor mass or an anchoring for attachment to the substrate. Stress peaks are thus reduced not only in the region of the meander, but also in the remainder of the bending spring device.

In one advantageous embodiment of the invention, another measure for reducing the load on the bending spring device may be achieved by the rounded transition having a non-constant radius of curvature. The meanders as well as the spring bars are thus connected to the adjacent components in a particularly gentle manner with regard to their stresses. The uniformity of the bending and the associated accuracy of the measurement by the sensor are thus improved.

It is particularly advantageous when the rounded transition is elliptical. This also has a positive effect regarding damage and the measuring accuracy of the sensor.

In one particularly advantageous embodiment of the invention, it is provided that the meander and/or the spring bar merge(s) in a branched manner into the sensor mass, the substrate, and/or an anchoring for attachment to the substrate. Stress peaks in the transition points are thus additionally reduced.

When the meander and/or the spring bar has/have a convex curvature, this results in a bending characteristic which reduces stress peaks even in extreme situations, such as mechanical shock events, for example. Damage to the sensor is thus largely avoided.

In one particularly advantageous embodiment of the invention, the bending spring device has multiple meanders which extend in a point symmetrical or axially symmetrical manner with respect to one another. This is advantageous in particular for high bending rates or large expected stresses, since the overall stress may be distributed over the multiple meanders.

A particularly weak inner curvature is achieved when the inflection region of the meander conforms to the inner circle of curvature by greater than 180°. As a result of the large radius of curvature of the inner circle of curvature which is thus made possible, this advantageously causes peak stresses to be distributed over a larger area, thus allowing them to be kept low.

When embodiments of the invention having multiple inner circles of curvature are provided, it is particularly advantageous when the meander conforms overall to the circles of curvature by greater than 180°. In addition, similarly as for a particularly large contact of a single inner circle of curvature, stress peaks are kept low. The individual circles of curvature are connected to linear or also curved sections of the spring.

To obtain a large contact of the circle(s) of curvature, it is advantageous when the circle of curvature of the outer midpoint, or, for multiple outer circles of curvature, the circles of curvature of the outer midpoints, conform(s) overall to the meander by greater than 90°. A concave or convex curvature of the meander is thus achieved.

BRIEF DESCRIPTION OF THE DRAWINGS

Further advantages of the invention are described in the following exemplary embodiments.

DETAILED DESCRIPTION OF THE PREFERRED EMBODIMENTS

Figure 1:
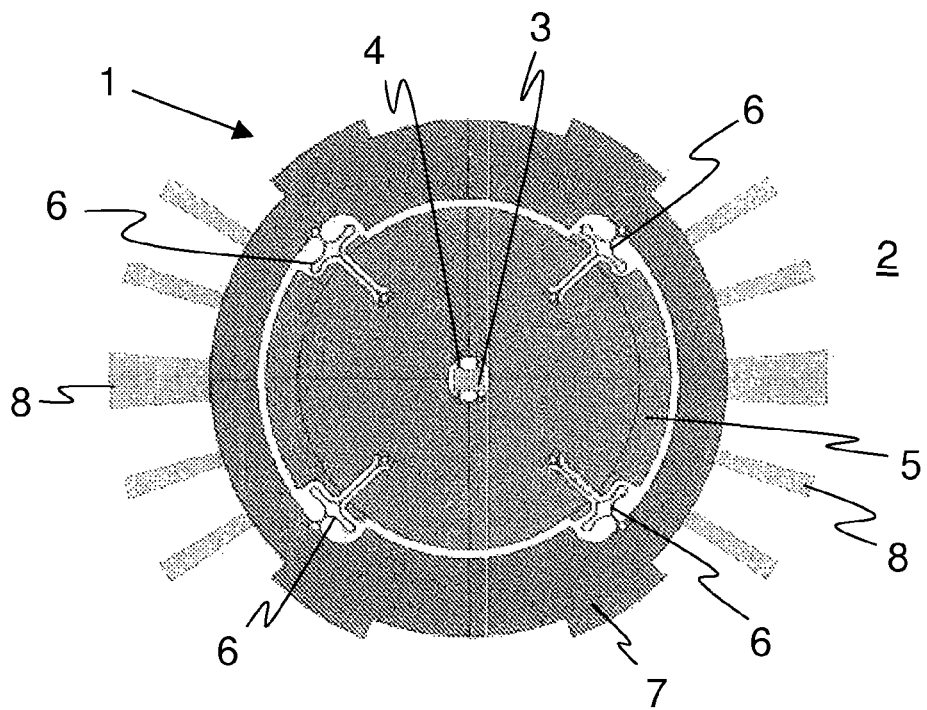
FIG. 1 shows a top view of a gyroscope.

FIG. 1 shows a top view of a sensor 1 according to the invention, in the present case, a yaw rate sensor for detecting rotations of the sensor 1 about an axis. An anchoring 3 is situated on a substrate 2 of the sensor 1, and a sensor mass 5 is rotatably fastened to the anchoring by means of four springs 4. The sensor mass 5 is connected to the drive mass 7 by means of a bending spring device 6. Four of the bending spring devices 6 are uniformly distributed at the periphery of the sensor mass 5. The drive mass 7, by means of electrodes 8 attached thereto, is to be set in a primary motion in which it vibrates in an oscillating manner about the z axis which projects out of the plane of the drawing. This primary motion is completed almost exclusively by the drive mass 7, and does not continue on the sensor mass 5. Thus, the sensor mass 5 does not take part in the primary motion of the drive mass 7. If the substrate 2, i.e., the sensor 1, then rotates about an x or y axis situated in the plane of the drawing, Coriolis forces result which attempt to tilt the drive mass 7 about the y or x axis. As the result of an appropriate controlled stiffness of the springs 4 and bending spring devices 6, the drive mass 7 together with the sensor mass 5 allows this motion. For this purpose, the bending spring devices 6 are designed in such a way that on the one hand they allow decoupling of the oscillation of the drive mass 7 from the sensor mass 5 in the primary oscillation, i.e., have a relatively soft design in the circumferential direction with regard to the reaction motion, namely, the secondary oscillation about the y or x axis, and on the other hand they have a relatively stiff design, so that the deflecting drive mass 7 allows the sensor mass 5 to take part in this motion.

Due to the necessary bending of the bending spring device 6 in the circumferential direction, and on the other hand because of the stiffness with regard to an oscillation about the y or x axis, very different requirements are imposed on the bending spring devices 6 which sometimes result in high bending stresses. The design according to the invention of the sensor has bending spring devices 6 which, due to a targeted design, prevent these excessive bending stresses on the bending spring device 6.

Figure 2:
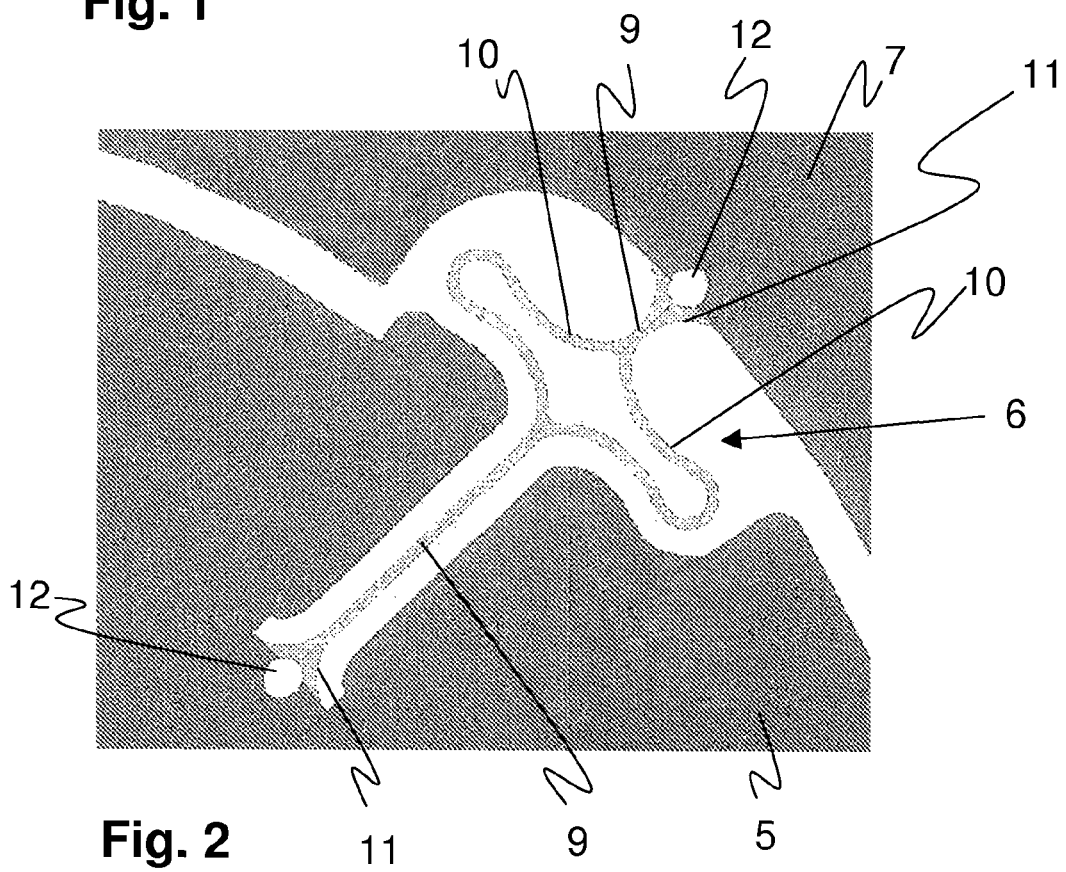
FIG. 2 shows a detail from FIG. 1.

FIG. 2 shows the bending spring device 6 in an enlarged illustration. The bending spring device 6 is composed of a spring bar 9 and two meanders 10 situated thereon. The meanders 10 are located on a type of fork or branch of the spring bar 9. The meanders extend essentially at right angles to the length of the spring bar 9, on both sides of the spring bar 9.

At its first end having a rounded transition 11, the spring bar 9 is situated on the sensor mass 5. The other end of the spring bar 9, likewise having a rounded transition 11, is situated on the drive mass 7. To avoid an unfavorable mass accumulation and to improve the strength at the connecting points, in the region of the transitions 11 a recess 12 is provided in each case which forms a branch of the spring bar 9. The transitions may, for example, be circular or also elliptical.

The meander 10 is rounded, and has radii of curvature which on the one hand have an inner midpoint and on the other hand have outer midpoints. Starting at the spring bar 9, the meander 10 is composed of a first rounded subregion whose center of curvature is outside the meander 10. This first curvature results in a concave curvature of the meander 10. This first section is adjoined by a curve having a radius of curvature whose midpoint is inside the meander 10. This second curvature extends around an inflection point of the meander. In the present exemplary embodiment, this second curved section conforms to its circle of curvature by greater than 180° in order to compensate for the first inwardly directed concave curvature. This is followed by a third section which once again has a concave curvature of the meander 10. The midpoint of the present circle of curvature is once again outside the meander 10. The meander 10 then bends back into the spring bar 9. This curvature with the spring bar is also gradual, and has a rounded transition. The two meanders 10 are mirror images of one another. However, depending on the requirements for the bending spring device 6, the meanders may also be asymmetrical; i.e., only one meander 10 might be present, or the two meanders 10 could have different designs. This design principle avoids a situation in which a region having a high degree of curvature, i.e., a small radius of curvature, is formed at the outer end of the meander, at its inflection region. In regions of high curvature, during load on the bending spring device 6 high stress peaks usually form which may adversely exceed the breaking point of the material.

Figure 3A:
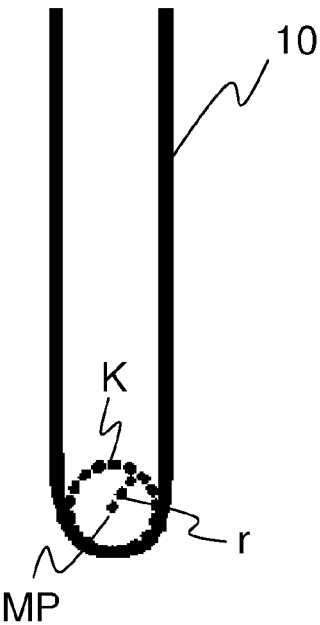
FIG. 3a shows a schematic illustration of the design of a bending spring according to the prior art.
Figure 3B:
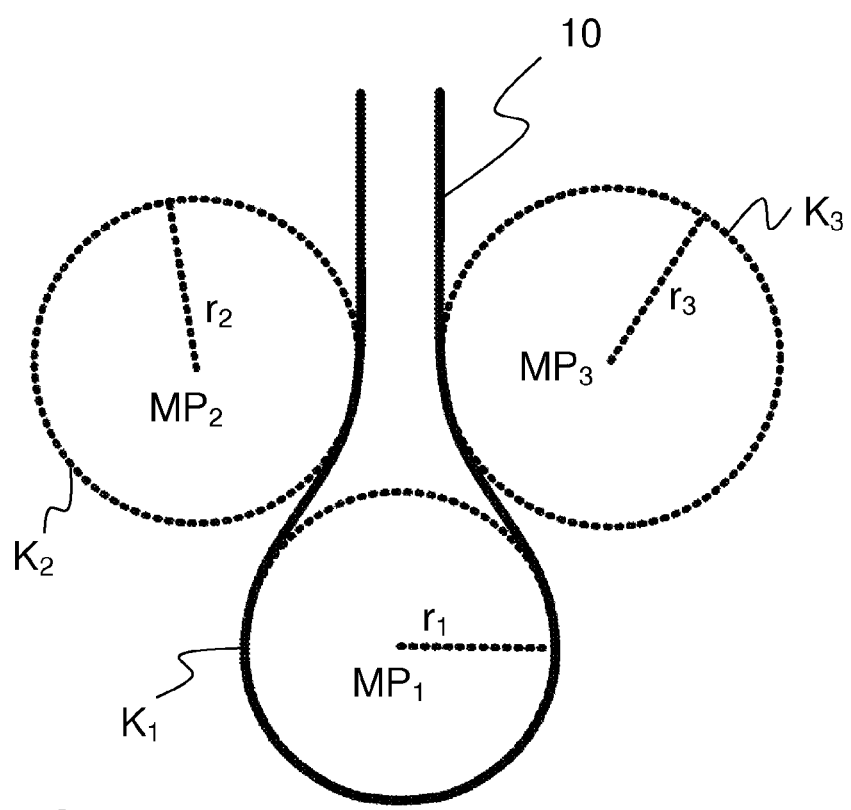
FIG. 3b shows a schematic illustration of the design of a bending spring according to the invention.

FIGS. 3a, 3b illustrate the design principle of the bending spring device 6 according to the invention. FIG. 3a shows a meander 10 as it would appear without the modified geometry within the meaning of the present invention. The turn of the meander conforms to a circle of curvature K having a radius r and midpoint MP. Due to the small distance between the spring bars, the radius of curvature r is small, and the curvature is correspondingly high. If this structure is subjected to load by forces situated within the plane of the drawing, a deformed state results which likewise is within the plane of the drawing. The peak stresses which occur are always located in the region of the smallest radii of curvature, thus, in the present case, in the region of the circle of curvature K.

In FIG. 3b this peak stress region has been mitigated by reducing the curvature, i.e., enlarging the radius of curvature r1 compared to r. As a result, the inflection region of the meander now conforms to the circle of curvature K1 by greater than 180°. To also achieve a small distance between the inner quasi-parallel meander bars, which is desirable from a design standpoint, the spring must be bent back in such a way that it conforms to circles of curvature K2 and K3, whose midpoints—in contrast to the inner circle of curvature K1—are situated outside the meander. Here as well, it is ensured that the radii of curvature r2 and r3 are kept as large as possible in order to avoid regions of high curvature, and therefore high peak stresses, to the greatest extent possible.

As a result of this curved design of the meander 10, stress peaks during a deflection of the bending spring device 6, i.e., the meander 10, are kept so low that in normal operation of the sensor, damage to the bending spring device 6 or meander 10 is avoided, even under extreme operating conditions such as shock situations, for example. The bending stresses are much lower than for bending spring devices of the prior art according to FIG. 3a, which are designed without such interrelated radii of curvature.

FIGS. 4-10 illustrate various designs of meanders according to the present invention. These exemplary embodiments are not all-inclusive. A number of other bending spring devices are possible which are designed according to the inventive principle.

Figure 4:
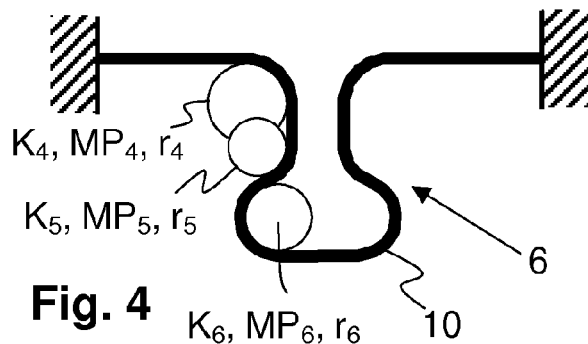
FIG. 4-10 show examples of bending spring devices according to the invention.

FIG. 4 shows a bending spring device 6 according to the invention, having a meander 10 which in its first section has two bending radii in the outer region. Starting from a linear progression of the bending spring device 6, the meander 10 having a circle of curvature K4 is introduced. The meander 10 extends essentially at a right angle away from the first linear progression, starting at a first component. A further, smaller circle of curvature K5 is subsequently provided, by means of which the bending spring extends practically in the opposite direction. In the region of the inflection point of the meander 10, on the inside of the meander 10, a third circle of curvature K6 is provided, to which the bending spring conforms. After a short linear section, the bending spring leads back, with the same bending radii K6, K5, and K4, to the last linear section and opens into the second elastically supported component. Thus, the two components situated to the left and right of the bending spring device 6, which may be the sensor mass 5 and the drive mass 7, or also an anchoring 3 and the sensor mass 5 or the drive mass 7, for example, are elastically connected to one another by means of the bending spring device 6. As a result of the corresponding radii of the circles of curvature, which are as large as possible, to which the bending spring device 6, i.e., the bending spring, conforms, a much softer and more flexible transition of the individual sections is achieved, thus allowing stress peaks to be kept low.

Figure 4A:
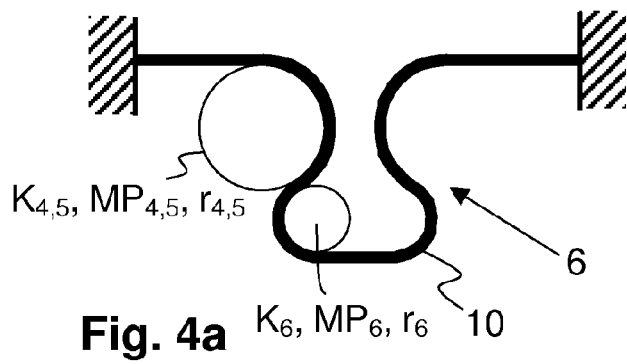

FIG. 4a shows a bending spring device 6 which is optimized compared to the design in FIG. 4. The circles of curvature K4 and K5 have been combined into a single circle of curvature K4,5. The larger radius of the circle of curvature K4,5 compared to the radii of the circles of curvature K4 and K5 results in a smaller curvature (curvature=1/radius) of the circle of curvature K4,5. The stress on the bending spring is therefore lower, and the risk of damage is thus reduced.

Figure 5:
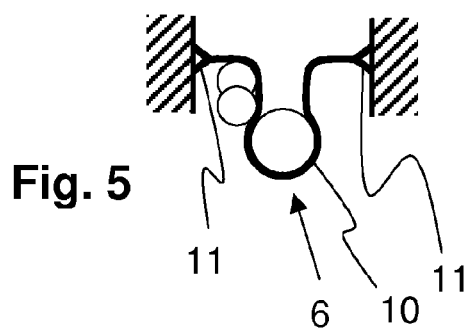

FIG. 5 illustrates a meander 10 according to the invention, having two outer circles of curvature and one inner circle of curvature. The return back to the second component is symmetrical, once again having two outer circles of curvature. The transition 11 into the components, each of which is to be elastically supported, is made via a type of fork of the bending spring. The transition 11 of the bending spring device 6 into the components to be connected is thus also made in a particularly suitable manner. The two outer radii of curvature are such that they have an osculating line of greater than 90° overall at the circles of curvature, so that the bending spring is deflected by greater than 90°. In contrast to the design in FIG. 4, in the present case only a single inner circle of curvature is provided. The contact of the bending spring is greater than 180°.

Figure 5A:
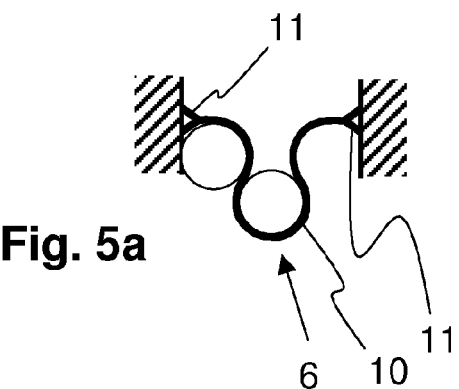

FIG. 5a shows a design which is improved over that in FIG. 5. The two outer circles of curvature in each case have been combined into one large circle of curvature having a small curvature of the bending spring which conforms thereto. Since according to the invention a strong curvature of the bending spring is less favorable than a weak curvature, this embodiment also has advantages compared to the embodiments in FIGS. 4 and 4a, since the inner circle of curvature is as large as possible, and the inflection is not divided into two or more smaller circles of curvature.

Figure 6:
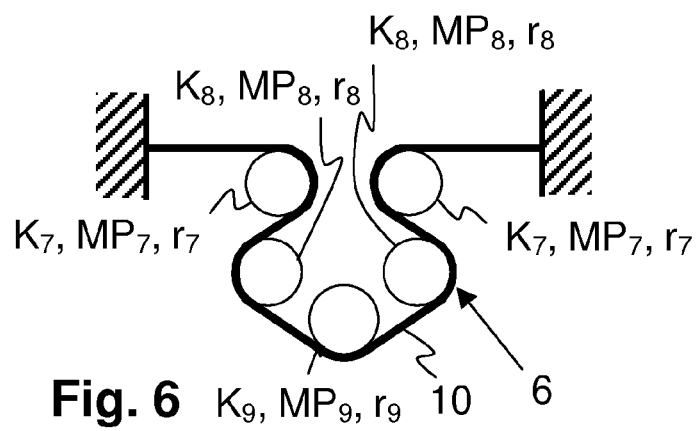

In FIG. 6 an outer circle of curvature K7 and three inner circles of curvature K8 (twice) and K9 are provided. The bending spring of the bending spring device 6 conforms to these circles K7, K8, and K9, resulting in a particularly gentle transition. The sum of the contacts of the inner circles of curvature K8 and K9 is greater than 180°, and the contact of the respective outer circle of curvature K7 is greater than 90°. The respective circles of curvature may be connected by means of straight or curved spring sections.

Figure 7:
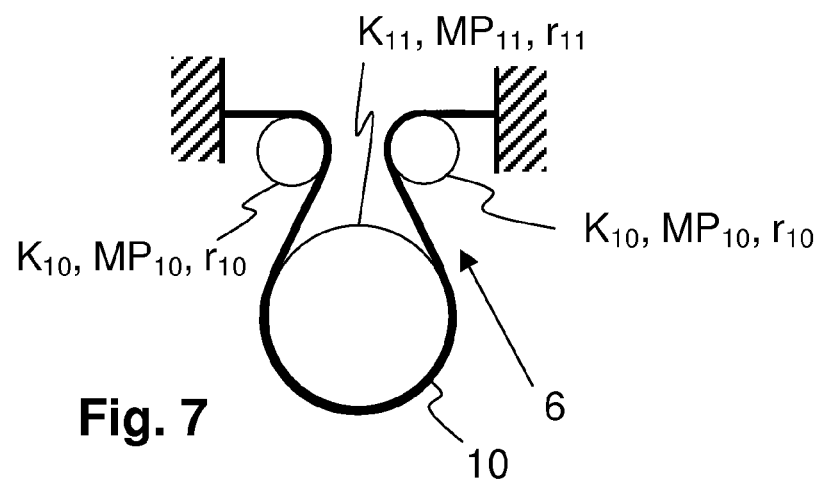

The bending spring device 6 in FIG. 7 is optimized compared to the design according to FIG. 6. This bending spring device conforms to two outer circles of curvature K10 and a large inner circle of curvature K11. The outer circles of curvature K10 are situated inside the projection of the inner circle of curvature K11, resulting in a convex curvature of the bending spring. Particularly high elasticity and a low-stress design of the bending spring device 6 are achieved in this manner. The circles of curvature K10 are smaller than the circle of curvature K11; in another embodiment this may also be reversed. In the ideal case, all of the circles of curvature in question are approximately the same size, since an attempt is generally made to maximize all radii of curvature.

Figure 8:
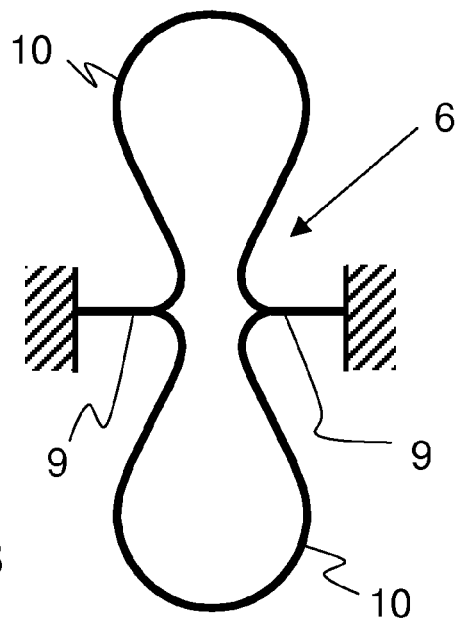

FIG. 8 shows a bending spring device 6 having a double meander 10. The two meanders 10 are symmetrical to one another, and in each case approximately correspond to the meander 10 in FIG. 7. A bending characteristic which is essentially the same in both directions of the bending spring device 6 is ensured by the symmetrical design.

Figure 9:
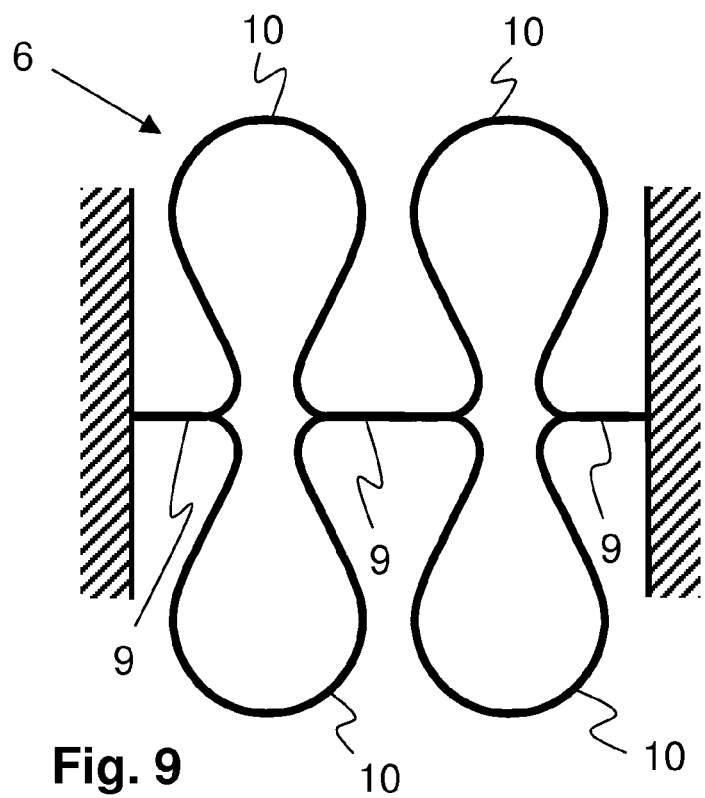

In FIG. 9, the bending spring device 6 from FIG. 8 is provided twice, one behind the other. The total of four meanders 10 form a particularly elastic bending spring device 6 which keeps stress peaks particularly low and provides a stable, durable bending spring device 6.

Figure 10:
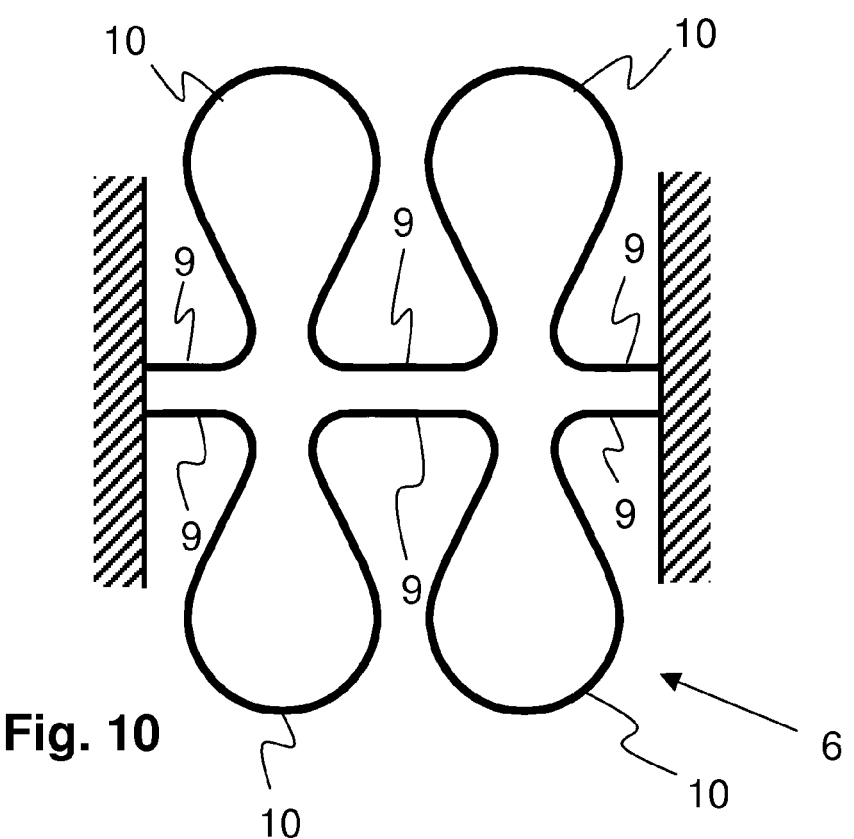

FIG. 10 shows a modification of the bending spring device 6 from FIG. 9. The spring bars 9 have a two-part design in the region of the interconnected components and between the meander pairs 10. The elasticity and load capacity of such a bending spring device is increased even more.

The illustrated exemplary embodiments represent only a few of the designs of bending spring devices for micromechanical sensors which are possible according to the invention. Various types and sizes of circles of curvature, as well as different numbers of circles of curvature which are formed by the bending spring devices and the meanders, are possible. In addition, the term "circle" is to be construed in a very general manner. Freely configured curves are also possible. It is important that the center of curvature is on the particular described side of the bending spring. Circular arcs which merge into one another may also be used. Also important are the circles of curvature of the meander, situated inside as well as outside the meanders, which in one particularly advantageous embodiment result in convex curvatures, and thus, regions of weaker curvature and therefore reduced peak stresses. Uniform, gradually transitioning changes in the direction vector of the bending springs are achieved in this manner, thus keeping stress peaks low, in particular under extreme loads on the bending spring device, and therefore largely avoiding damage to the bending spring device.

LIST OF REFERENCE NUMERALS/CHARACTERS

1 Sensor
2 Substrate
3 Anchoring
4 Spring
5 Sensor mass
6 Bending spring device
7 Drive mass
8 Electrodes
9 Spring bar
10 Meander
11 Transition
K Circle of curvature
MP Midpoint
R Radius

What is claimed is:

1. A gyroscope comprising:
a substrate;
a first mass located above the substrate, the first mass adapted to oscillate from a first location on the substrate about at least one of an x-axis and a y-axis of the substrate; and
a first bending spring coupled to the first mass to allow the oscillation of the first mass, the first bending spring comprising:
a first spring bar coupled to the first mass;
a first meander extending essentially at a right angle to the first spring bar, the first meander extending along a first axis in a first direction, wherein the first meander has a linear section between two radii defined by two circles of curvature; and
a second meander extending essentially at a right angle to the first spring bar, the second meander extending along the first axis in a second direction.

2. The gyroscope of claim 1 wherein the first spring bar comprises a recess that forms a branch that couples the first bending spring to the first mass.

3. The gyroscope of claim 1 wherein the first meander has a rounded end defined by a circle of curvature.

4. The gyroscope of claim 1 wherein the first meander has a circle of curvature that has an inner midpoint and a radius of curvature inside the first meander.

5. The gyroscope of claim 1 wherein first bending spring has a non-constant radius of curvature.

6. The gyroscope of claim 1 wherein the first meander and the spring bar have a convex curvature.

7. The gyroscope of claim 1 wherein the first meander and the spring bar have an elliptical bend.

8. A gyroscope comprising:
a substrate;
a first mass located above the substrate, the first mass adapted to oscillate from a first location on the substrate about at least one of an x-axis and a y-axis of the substrate;
a second mass adapted to oscillate from the first location on the substrate about a z-axis of the substrate;
bending springs coupling the first mass to the second mass, each of the bending springs comprising:
a spring bar coupled to the first mass;

a first meander extending essentially at a right angle to the spring bar, the first meander extending along a first axis; and a second meander extending essentially at a right angle to the spring bar, the second meander extending along the first axis;

wherein each of the first and second meanders has a linear section between two radii defined by two circles of curvature.

9. The gyroscope of claim 8 further comprising a central anchor that is the first location from which the first and second masses oscillate.

10. The gyroscope of claim 8 wherein each of the bending springs couples the first mass to the second mass for oscillation together about the x-axis or y-axis of the substrate and decouples the first mass from oscillation of the second mass about the z-axis of the substrate.

11. The gyroscope of claim 8 wherein the first mass oscillates about the x-axis.

12. The gyroscope of claim 8 wherein the first mass oscillates about the x-axis and the y-axis.

13. The gyroscope of claim 8 wherein each of the first and second meanders has a rounded end defined by a circle of curvature.

14. The gyroscope of claim 8 wherein the first meander has a circle of curvature that has an inner midpoint and a radius of curvature inside the first meander.

15. The gyroscope of claim 13 wherein the bending springs have nonconstant radii of curvatures.

16. The gyroscope of claim 8 wherein each of the spring bars comprises a recess that forms a branch that couples the bending springs to the first and second masses, respectively.

* * * * *